(12) United States Patent
Asfia et al.

(10) Patent No.: US 9,016,633 B2
(45) Date of Patent: Apr. 28, 2015

(54) ELECTROMECHANICAL ACTUATOR (EMA) HEAT SINK INTEGRATED DE-ICING SYSTEM

(75) Inventors: Julie Fatemeh Asfia, Huntington Beach, CA (US); David Blanding, Hawthorne, CA (US); Jeffrey Coffman, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 862 days.

(21) Appl. No.: 13/159,390

(22) Filed: Jun. 13, 2011

(65) Prior Publication Data

US 2012/0312925 A1     Dec. 13, 2012

(51) Int. Cl.
*B64D 15/00*     (2006.01)
*B64D 15/02*     (2006.01)
*B64D 15/12*     (2006.01)
*B64C 13/50*     (2006.01)

(52) U.S. Cl.
CPC ............. *B64D 15/02* (2013.01); *B64D 15/12* (2013.01); *B64C 2013/506* (2013.01)

(58) Field of Classification Search
CPC ........ B64D 15/00; B64D 15/02; B64D 15/04; B64D 15/163
USPC ............. 244/134 R, 134 B, 134 D; 60/39.093
See application file for complete search history.

(56) References Cited

U.S. PATENT DOCUMENTS

| | | | |
|---|---|---|---|
| 5,222,696 A * | 6/1993 | Brigham et al. | 244/134 R |
| 6,294,853 B1 | 9/2001 | Lin et al. | |
| 7,834,494 B2 | 11/2010 | Blanding et al. | |
| 7,900,437 B2 * | 3/2011 | Venkataramani et al. | 60/267 |
| 8,015,789 B2 * | 9/2011 | Brand et al. | 60/39.093 |
| 2003/0111924 A1 | 6/2003 | Ma et al. | |
| 2009/0288814 A1 | 11/2009 | Stoia et al. | |

FOREIGN PATENT DOCUMENTS

FR     2937304 A1     4/2010

OTHER PUBLICATIONS

GB1210213.3—Combined Search and Examination Report, Sep. 27, 2012.
GB1210213.3—Combined Search and Examination Report, Sep. 27, 2012; Cited Reference FR2937304 Evaluation and Relevant section English translation.

* cited by examiner

*Primary Examiner* — Rob Swiatek
(74) *Attorney, Agent, or Firm* — Ameh IP; Elahe Toosi; Lowell Campbell

(57) ABSTRACT

A de-icing system and method. An electromechanical actuator heat sink is operable to receive heat from an electromechanical actuator, and a heat distribution element is operable to distribute heat to a surface. A heat transportation device is operable to transport heat from the electromechanical actuator heat sink to the heat distribution element.

17 Claims, 4 Drawing Sheets

ELECTROMECHANICAL ACTUATOR (EMA) HEAT SINK INTEGRATED DE-ICING SYSTEM

FIELD

Embodiments of the present disclosure relate generally to ice protection systems. More particularly, embodiments of the present disclosure relate to heated ice protection systems.

BACKGROUND

Under various flight conditions, ice may accumulate on aircraft surfaces such as leading edges, wings, tailplanes, and vertical stabilizers as an aircraft flies through a cloud containing super-cooled water droplets. Super-cooled water is water that is below freezing, but still a liquid. Normally, super-cooled water would turn to ice at 0° C., but there are no contaminants or nuclei from which ice crystallization freezing can start. When the aircraft flies through the super-cooled water droplets, the aircraft becomes a droplet nucleus, allowing the super-cooled water to freeze on an aircraft surface. This process is known as accretion. Super-cooled water droplets often occur in stratiform and cumulus clouds.

Airframe icing problems are generally caused by ice modifying airflow over ice covered aerodynamic lift surfaces such as a wing or tailplane. When ice accretes on aerodynamic lift surfaces, airflow modification changes aerodynamics of the aerodynamic lift surfaces by modifying their shape and surface roughness. Aerodynamic effects of icing on an aerodynamic lift surface are a function of the ice quantity, shape, and location, but typically increase drag and decrease lift. A composite effect of the increase in drag and decrease in lift is a degradation of aircraft flight dynamics.

SUMMARY

A de-icing system and method are disclosed. An electromechanical actuator heat sink receives heat from an electromechanical actuator (EMA), and a heat distribution element distributes heat to an aerodynamic surface. Further, a heat transportation device transports heat from the electromechanical actuator heat sink to the heat distribution element.

Transferring heat from an EMA to the aerodynamic surface can save weight, volume and energy in an aircraft ice protection system. For example, energy from an EMA in an aircraft wing can provide, for example but without limitation, approximately 30% of required energy for a slat of an aircraft ice protection system.

In an embodiment, an aircraft de-icing system comprises an electromechanical actuator heat sink, a heat distribution element, and a heat transportation device. The electromechanical actuator heat sink is operable to receive heat from an electromechanical actuator, and the heat distribution element is operable to distribute heat to an aerodynamic surface. Further, the heat transportation device is coupled to the electromechanical actuator heat sink and the heat distribution element, and is operable to transport heat from the electromechanical actuator heat sink to the heat distribution element.

In another embodiment, a method for aircraft de-icing receives heat from an electromechanical actuator at an electromechanical actuator heat sink. The method further transports heat from the electromechanical actuator heat sink to a heat distribution element, and distributes heat to an aerodynamic surface via the heat distribution element.

In yet another embodiment, a method for providing a heat recycling system provides an electromechanical actuator heat sink operable to receive heat from an electromechanical actuator. The method further provides a heat distribution element operable to distribute heat to a surface, and provides a heat transportation device operable to transport heat from the electromechanical actuator heat sink to the heat distribution element.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to electrical control systems, actuation mechanisms, heat transfer, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, deicing of an aircraft aerodynamic surface. Embodiments of the disclosure, however, are not limited to such aerodynamic surface applications, and the techniques described herein may also be utilized in other applications. For example but without limitation, embodiments may be applicable to, ships, automobiles, trains, submarines, various heating applications, windmills, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
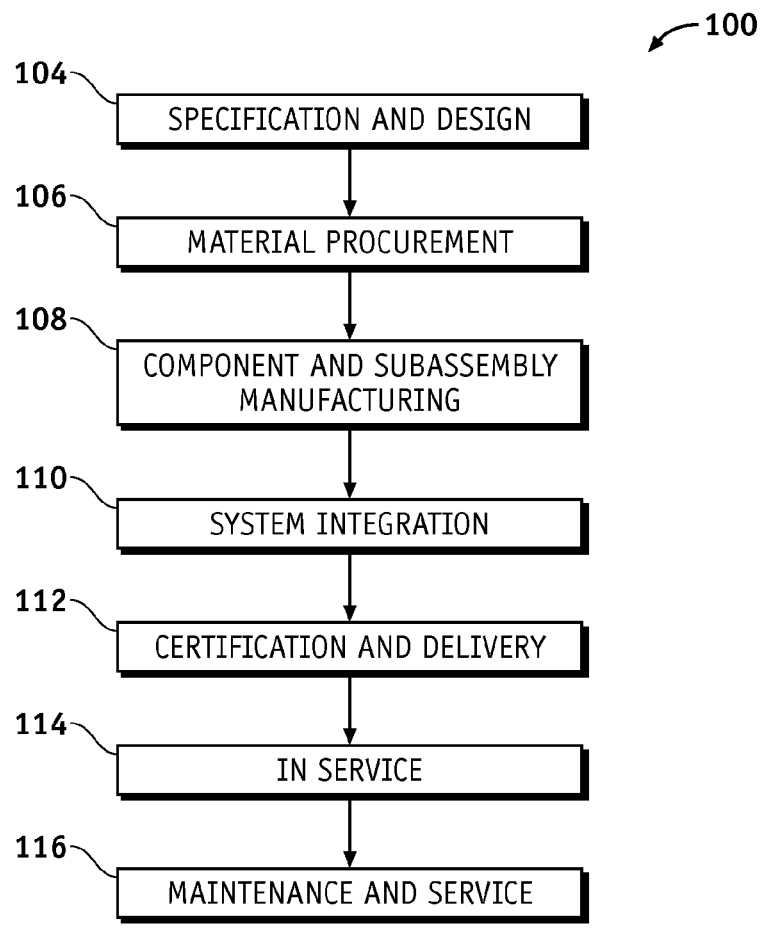
FIG. 1 is an illustration of a flow diagram of an exemplary aircraft production and service methodology.
Figure 2:
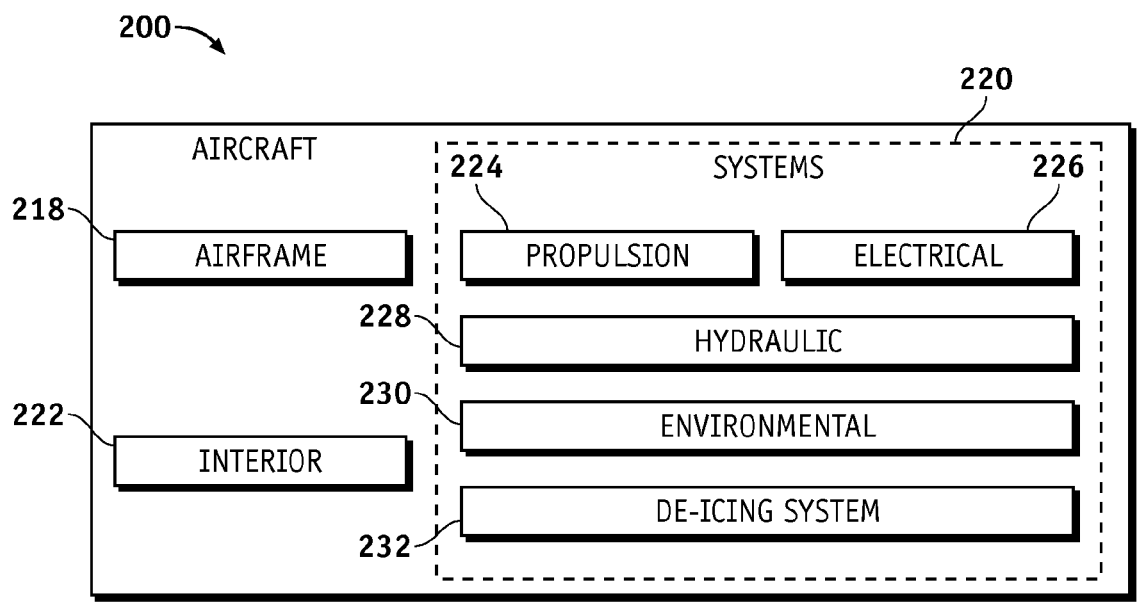
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, an environmental system 230, and a de-icing system 232. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

A problem with existing aircraft ice protection systems is they require aircraft power in order to generate heat. In contrast to the existing ice protection systems, embodiments of the disclosure "recycle" heat generated by an electromechanical actuator (EMA) to de-ice an aerodynamic surface. Thus, EMA waste energy is used as an input into the ice protection system to generate heat.

Figure 3:
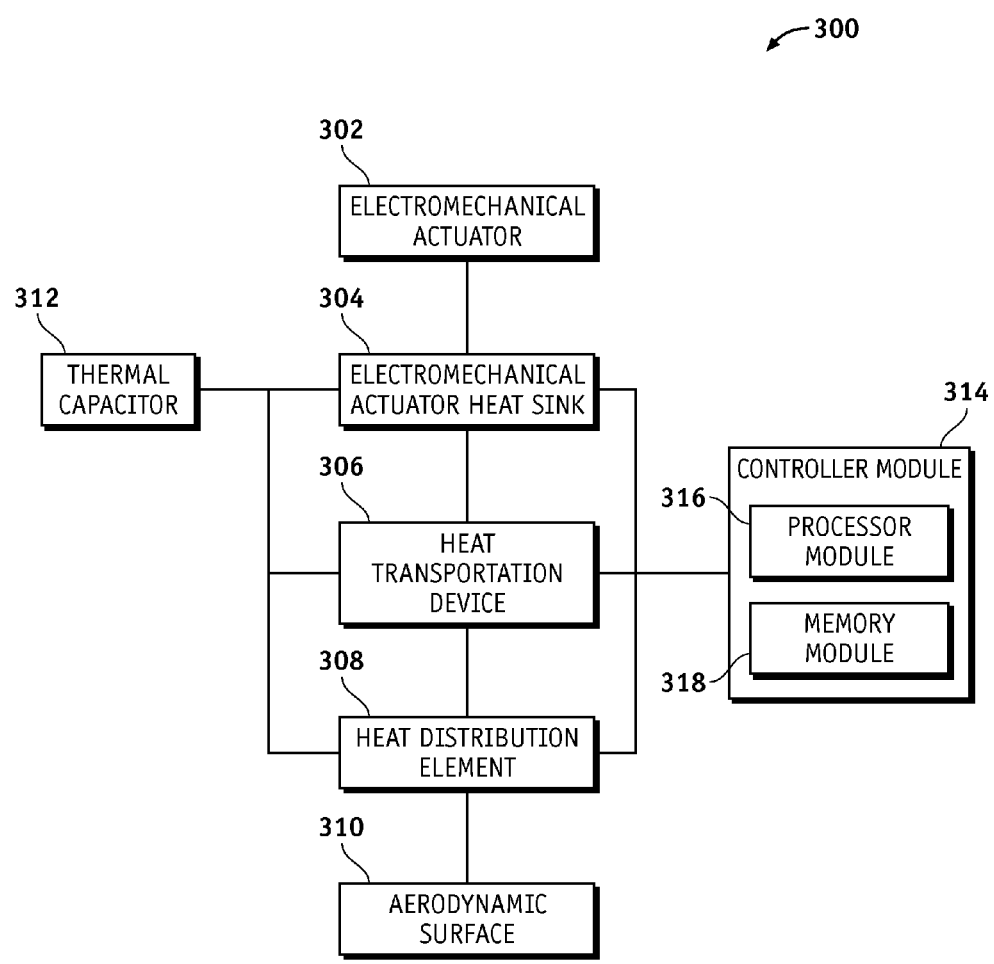
FIG. 3 is an illustration of an exemplary functional block diagram of an aircraft de-icing system integrated with an EMA heat sink and a heat distributor according to an embodiment of the disclosure.

FIG. 3 is an illustration of an exemplary functional block diagram of an aircraft de-icing system integrated with an EMA heat sink and a heat distributor (system 300) according to an embodiment of the disclosure. The system 300 generally comprises an electromechanical actuator 302, an electromechanical actuator heat sink 304, a heat transportation device 306, a heat distribution element 308, an aerodynamic surface 310, a thermal capacitor 312, and a controller module 314.

The electromechanical actuator 302 comprises a mechanical device for moving or controlling a mechanism or system operated by electric energy, and converts that electric energy into some kind of motion. As a byproduct, heat is generally produced. Mechanical actuators operate by conversion of rotary motion into linear motion, or vice versa. Conversion is commonly made via a few simple types of mechanism, for example but without limitation, a screw, screw jack, ball screw, roller screw, wheel, axle, hoist, winch, rack and pinion, chain drive, belt drive, rigid chain, rigid belt, drum, gear, pulley, shaft, linear member, cable, rack, chain, belt, and the like.

Actuators may be used, for example but without limitation, as mechanisms to introduce motion, to clamp an object so as to prevent motion, and the like. The electromechanical actuator 302 may comprise, for example but without limitation, electrical motors, pneumatic actuators, hydraulic actuators, linear actuators, comb drive, piezoelectric actuators and amplified piezoelectric actuators, thermal bimorphs, micromirror devices and electro-active polymers, and the like.

The electromechanical actuator heat sink 304 is coupled to the electromechanical actuator 302, and is operable to absorb heat from the electromechanical actuator 302. The electromechanical actuator heat sink 304 may comprise, for example but without limitation, a heat exchanger comprising a thermally-conductive fluid barrier, and the like. The heat exchanger may comprise a thermally-conductive fluid barrier comprising a first and a second surface, at least one first type of foam element disposed in thermally-conductive contact with the first surface of the thermally-conductive fluid barrier and having a first coefficient of thermal expansion and at least one second type of foam element disposed in thermally-conductive contact with the second surface of the thermally-conductive fluid barrier and having a second coefficient of thermal expansion. The first coefficient of thermal expansion of the at least one first type of foam element and the second coefficient of thermal expansion of the at least one second type of foam element are substantially different.

The heat transportation device 306 is coupled to the electromechanical actuator heat sink 304 and the heat distribution element 308, and is operable to transport heat from the electromechanical actuator heat sink 304 to the heat distribution element 308. The heat transportation device 306 may comprise any kind of heat transport device, for example but without limitation, a heat pipe, a liquid line, a heat exchanger, a circulating liquid, a heat pump, a thermoelectric heat pump, a heat conductive material, a heat conductive metal, a heat conductive solid, a heat conductive liquid, a heat conductive gas, a heat conductive plasma, and the like.

A heat pipe is a heat-transfer device that combines thermal conductivity and phase transition to transfer heat between two or more solid interfaces. At a hot interface of a heat pipe, a liquid in contact with a thermally conductive solid surface (the hot interface) turns into a vapor by absorbing heat from that thermally conductive solid surface via a liquid-to-vapor phase transition. The vapor condenses back into a liquid at a cold interface, releasing latent heat from a vapor-to-liquid phase transition. The liquid then returns to the hot interface through capillary or gravity action, where the liquid evaporates once more and repeats in a cycle.

An internal pressure of the heat pipe can be set or adjusted to facilitate the phase transition depending on operation requirements of the heat pipe. A heat pipe may comprise, for example but without limitation, a sealed pipe or tube made of a material with high thermal conductivity such as, but without limitation, copper, aluminum, and the like. The heat pipe may be filled with a working fluid, for example but without limitation, water, ethanol, acetone, sodium, mercury, and the like, chosen to match an operating temperature.

The heat distribution element 308 is coupled to the electromechanical actuator heat sink 304 and/or the heat transportation device 306, and the aerodynamic surface 310. The heat distribution element 308 is operable to distribute heat from the electromechanical actuator heat sink 304 and/or the heat transportation device 306 across the aerodynamic surface 310, thereby de-icing the aerodynamic surface 310. The heat distribution element 308 may comprise, for example but without limitation, a radiator, a pipe network, a conductive material network, a heat pipe network, and the like.

The aerodynamic surface 310 (surface) may comprise any part of an aircraft, structure, or vehicle, for example but without limitation, an aileron, a wing, a wing leading edge, a fuselage section, a tail fin, a rudder, a horizontal stabilizer, a nose cone, a tail cone, a landing gear, a landing gear door, a cargo door, a passenger door, leading edge of a control surface (i.e., an aileron leading edge), and the like. As mentioned above, embodiments may also be applicable to, for example, but without limitation, ships, automobiles, trains, submarines, various heating applications, windmills, and the like.

The thermal capacitor 312 may be coupled to, for example but without limitation, the electromechanical actuator heat sink 304, the heat distribution element 308, and the heat transportation device 306, and is operable to store heat received from the electromechanical actuator 302. The thermal capacitor 312 provides "inertia" against temperature fluctuations. When temperatures are fluctuating, a large thermal mass can serve to "flatten out" the temperature fluctuations. The thermal mass will absorb thermal energy when an object coupled to the thermal capacitor 312 is higher in temperature than the mass, and give thermal energy back when the object is cooler.

The controller module 314 may be coupled to the electromechanical actuator heat sink 304, the heat transportation device 306, the heat distribution element 308, and/or the thermal capacitor 312. The controller module 314 may comprise, for example but without limitation, a processor module 316, a memory module 318, and the like. In one embodiment, the controller module 314 regulates heat storage of the thermal capacitor 312. In another embodiment, the controller module 314 regulates heat transfer from the electromechanical actuator 302 to the heat distribution element 308.

The processor module 316 comprises processing logic that is configured to carry out the functions, techniques, and processing tasks associated with the operation of the system 300. In particular, the processing logic is configured to support the system 300 described herein. For example the processor module 316 may monitor, for example but without limitation, temperature measurements, temperature settings, regulation settings, and the like.

The processor module 316 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 318 may be a data storage area with memory formatted to support the operation of the system 300. The memory module 318 is configured to store, maintain, and provide data as needed to support the functionality of the system 300 in the manner described herein. For example the memory module 318 may store, for example but without limitation, temperature measurements, temperature settings, regulation settings, and the like.

In practical embodiments, the memory module 318 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 318 may be coupled to the processor module 316 and configured to store, for example but without limitation, a database, and the like. Additionally, the memory module 318 may represent a dynamically updating database containing a table for updating the database, and the like. The memory module 318 may also store, a computer program that is executed by the processor module 316, an operating system, an application program, tentative data used in executing a program, and the like.

The memory module 318 may be coupled to the processor module 316 such that the processor module 316 can read information from and write information to the memory module 318. For example the processor module 316 may access the memory module 318 to monitor for example but without limitation, temperature measurements, temperature settings, regulation settings, and the like.

As an example, the processor module 316 and memory module 318 may reside in respective application specific integrated circuits (ASICs). The memory module 318 may also be integrated into the processor module 316. In an embodiment, the memory module 318 may comprise a cache memory for storing temporary variables or other intermediate information during execution of instructions to be executed by the processor module 316.

Figure 4:
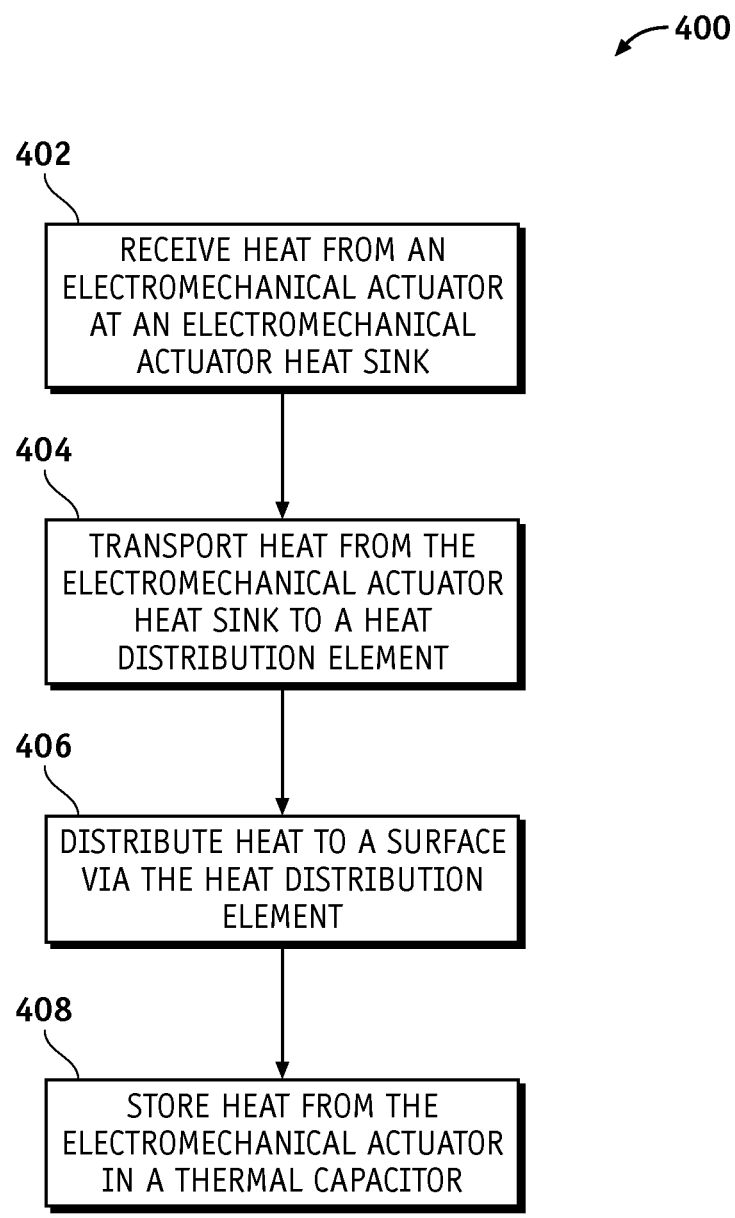
FIG. 4 is an illustration of an exemplary flowchart showing an aircraft de-icing process according to an embodiment of the disclosure.

FIG. 4 is an illustration of an exemplary flowchart showing an aircraft de-icing process 400 that can be suitably performed by an aircraft de-icing system integrated with an EMA heat sink and a heat distributor such as the system 300 according to an embodiment of the disclosure. The various tasks performed in connection with process 400 may be performed mechanically, by software, hardware, firmware, or any combination thereof. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein.

For illustrative purposes, the following description of process 400 may refer to elements mentioned above in connection with FIG. 3. In practical embodiments, portions of the process 400 may be performed by different elements of the system 300 such as: the electromechanical actuator 302, the electromechanical actuator heat sink 304, the heat transportation device 306, the heat distribution element 308, the aerodynamic surface 310, the thermal capacitor 312, the controller module 314, etc. The process 400 may have functions, material, and structures that are similar to the embodiments shown in FIG. 3. Therefore common features, functions, and elements may not be redundantly described here.

Process 400 may begin by receiving heat from an electromechanical actuator such as the electromechanical actuator 302 at an electromechanical actuator heat sink such as the electromechanical actuator heat sink 304 (task 402).

Process 400 may continue by transporting heat from the electromechanical actuator heat sink 304 to a heat distribution element such as the heat distribution element 308 (task 404).

Process 400 may continue by distributing heat to an aerodynamic surface such as the aerodynamic surface 310 using the heat distribution element 308 (task 406).

Process 400 may continue by storing heat from the electromechanical actuator 302 in a thermal capacitor such as the thermal capacitor 312 (task 408).

Figure 5:
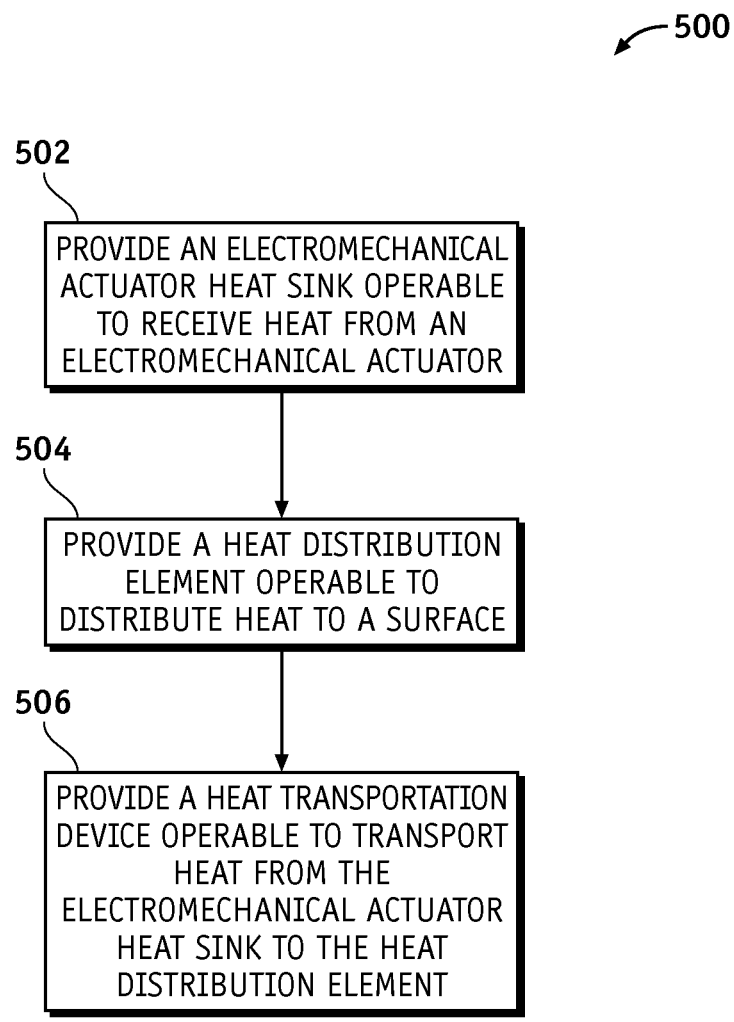
FIG. 5 is an illustration of an exemplary flowchart showing a process for providing a heat recycling system according to an embodiment of the disclosure.

FIG. 5 is an illustration of an exemplary flowchart showing a process 500 for providing a heat recycling system according to an embodiment of the disclosure. The various tasks performed in connection with process 500 may be performed mechanically, by software, hardware, firmware, or any combination thereof. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

For illustrative purposes, the following description of process 500 may refer to elements mentioned above in connection with FIG. 3. In practical embodiments, portions of the process 500 may be performed by different elements of the system 300 such as: the electromechanical actuator 302, the electromechanical actuator heat sink 304, the heat transportation device 306, the heat distribution element 308, the aerodynamic surface 310, the thermal capacitor 312, the controller module 314, etc. The process 500 may have functions, material, and structures that are similar to the embodiments shown in FIG. 3. Therefore common features, functions, and elements may not be redundantly described here.

Process 500 may begin by providing an electromechanical actuator heat sink such as the electromechanical actuator heat sink 304 operable to receive heat from an electromechanical actuator such as the electromechanical actuator 302 (task 502).

Process 500 may continue by providing a heat distribution element such as the heat distribution element 308 configured to distribute heat to a surface such as the aerodynamic surface 310 (task 504).

Process 500 may continue by providing a heat transportation device such as the heat transportation device 306 configured to transport heat from the electromechanical actuator heat sink 304 to the heat distribution element 308 (task 506).

In this way, embodiments of the disclosure provide a de-icing system and method. The de-icing system and method can save weight, volume, and energy in an aircraft ice protection system. For example, energy from an EMA in an aircraft wing can provide approximately 30% of required energy of for a slat of an aircraft ice protection system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 3 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An aircraft de-icing system comprising:
    an electromechanical actuator heat sink operable to receive heat from an electromechanical actuator;
    a heat distribution element operable to distribute heat to an aerodynamic surface;
    a heat transportation device coupled to the electromechanical actuator heat sink and the heat distribution element, and operable to transport heat from the electromechanical actuator heat sink to the heat distribution element; and
    a controller module operable to regulate heat transfer from the electromechanical actuator to the heat distribution element.

2. The aircraft de-icing system according to claim 1, wherein the heat transportation device comprises at least one member selected from a group consisting of: a heat pipe, a liquid line, a heat exchanger, a circulating liquid, a heat pump, a thermoelectric heat pump, a heat conductive material, a heat conductive metal, a heat conductive solid, a heat conductive liquid, a heat conductive gas, and a heat conductive plasma.

3. The aircraft de-icing system according to claim 1, further comprising a thermal capacitor operable to store heat from the electromechanical actuator.

4. The aircraft de-icing system according to claim 3, wherein the thermal capacitor is coupled to the electromechanical actuator heat sink.

5. The aircraft de-icing system according to claim 3, wherein the thermal capacitor is coupled to the heat distribution element.

6. The aircraft de-icing system according to claim 3, wherein the thermal capacitor is coupled to the heat transportation device.

7. The aircraft de-icing system according to claim 3, wherein the controller module is further operable to regulate heat storage of the thermal capacitor.

8. A method for aircraft de-icing comprising:
receiving heat from an electromechanical actuator at an electromechanical actuator heat sink;
transporting heat from the electromechanical actuator heat sink to a heat distribution element;
distributing heat to a surface of an aircraft via the heat distribution element to de-ice and said surface;
storing heat from the electromechanical actuator in a thermal capacitor; and
regulating heat storage of the thermal capacitor.

9. The method according to claim 8, wherein heat is transported via a heat transportation device comprising at least one member selected from a group consisting of: a heat pipe, a liquid line, a heat exchanger, a circulating liquid, a heat pump, a thermoelectric heat pump, a heat conductive material, a heat conductive metal, a heat conductive solid, a heat conductive liquid, a heat conductive gas, and a heat conductive plasma.

10. The method according to claim 8, further comprising regulating heat transfer from the electromechanical actuator to the heat distribution element.

11. A method for providing a heat recycling system in an aircraft de-icing system, the method comprising:
providing an electromechanical actuator heat sink operable to receive heat from an electromechanical actuator;
providing a heat distribution element operable to distribute heat to an aerodynamic surface;
providing a heat transportation device operable to transport heat from the electromechanical actuator heat sink to the heat distribution element;
coupling the heat transportation device to the electromechanical actuator heat sink and the heat distribution element; and
providing a controller module operable to regulate heat transfer from the electromechanical actuator to the heat distribution element.

12. The method according to claim 11, further comprising coupling the surface to the heat distribution element.

13. The method according to claim 11, wherein the heat transportation device comprises at least one member selected from a group consisting of: a heat pipe, a liquid line, a heat exchanger, a circulating liquid, a heat pump, a thermoelectric heat pump, a heat conductive material, a heat conductive metal, a heat conductive solid, a heat conductive liquid, a heat conductive gas, and a heat conductive plasma.

14. The method according to claim 11, further comprising regulating heat transfer from the electromechanical actuator to the heat distribution element.

15. The method according to claim 11, further comprising providing a thermal capacitor operable to store heat from the electromechanical actuator.

16. The method according to claim 15, wherein the controller module is further operable to regulate heat storage of the thermal capacitor.

17. The method according to claim 15, further comprising coupling the thermal capacitor to at least one member selected from the group consisting of: the electromechanical actuator heat sink, the heat distribution element, the heat transportation device.

* * * * *